June 7, 1955  J. A. CHILMAN ET AL  2,710,355
LOAD-SHARE RESPONSIVE DEVICE FOR PARALLELED
SYSTEM OF THREE-PHASE ALTERNATORS
Filed April 21, 1953  3 Sheets-Sheet 3
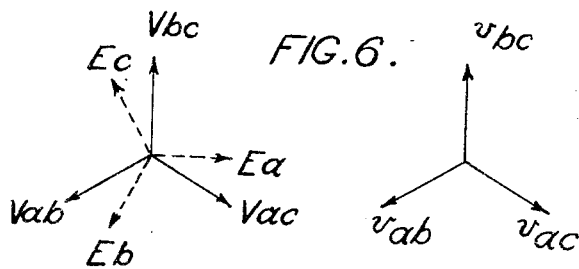
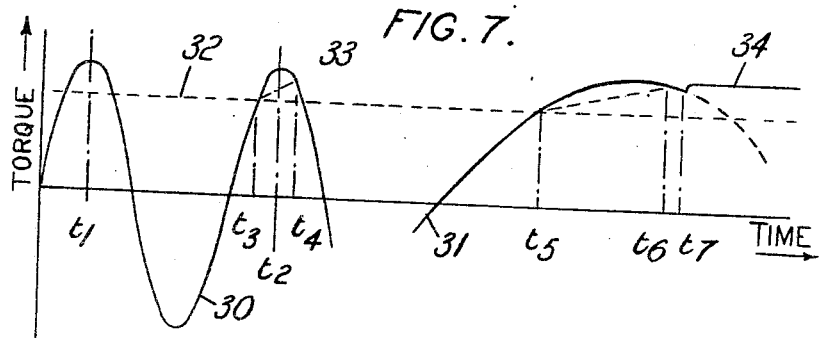
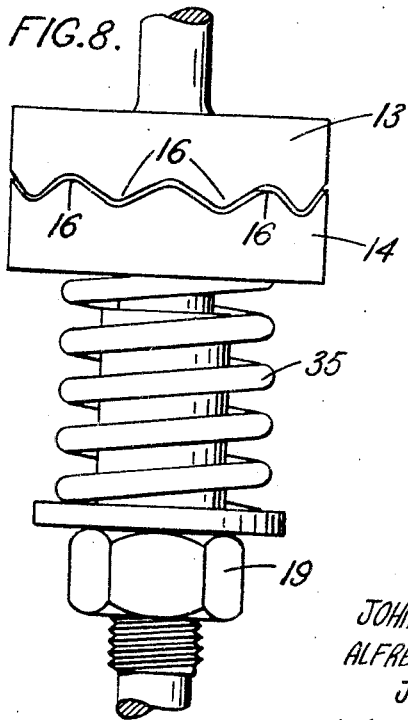
INVENTORS
JOHN ALFRED CHILMAN &
ALFRED GEORGE MAPP &
JOHN CRIPPS
BY Wilkinson & Mawhinney
ATTYS.

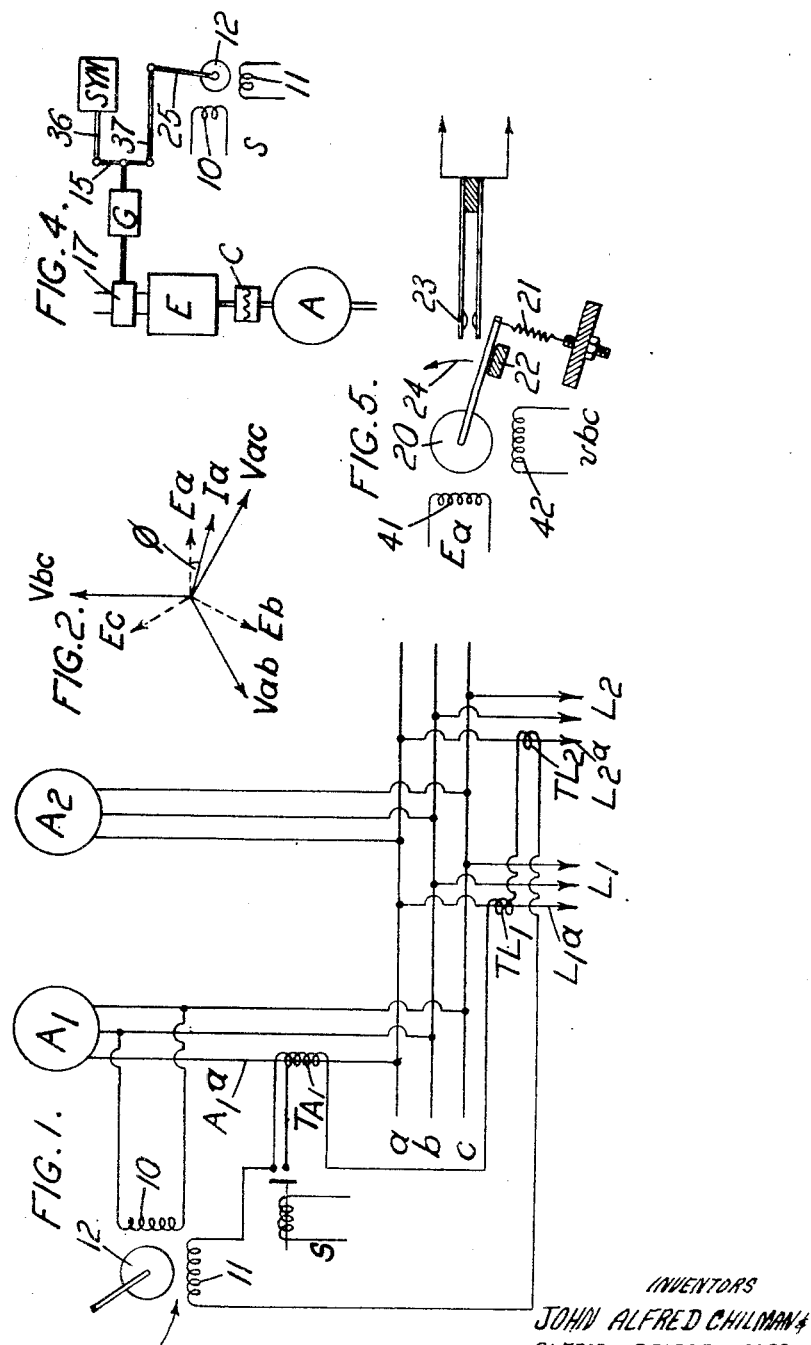

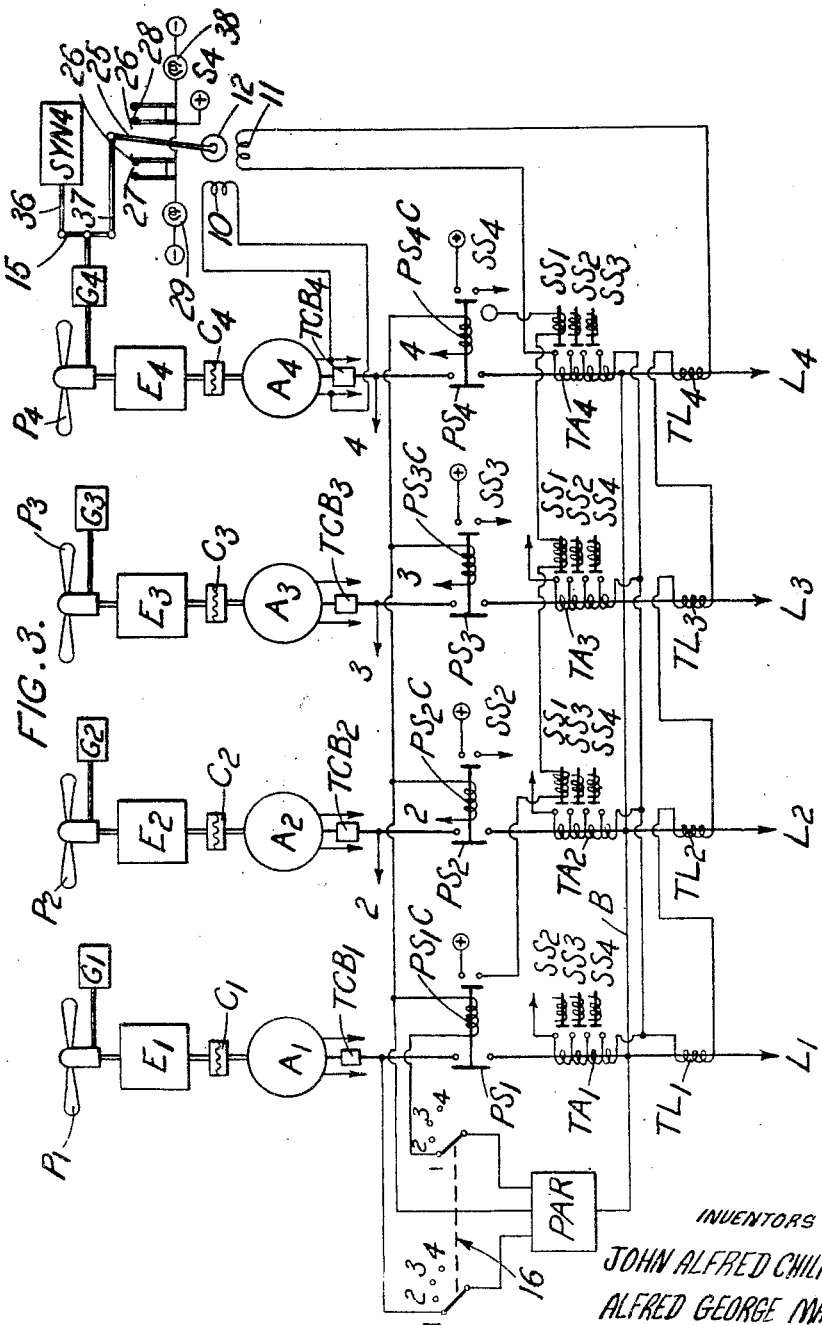

United States Patent Office 2,710,355
Patented June 7, 1955

2,710,355

LOAD-SHARE RESPONSIVE DEVICE FOR PARALLELED SYSTEM OF THREE-PHASE ALTERNATORS

John Alfred Chilman, Alfred George Mapp, and John Cripps, Gloucester, England, assignors to Rotol Limited, Gloucester, England, a British company Application April 21, 1953, Serial No. 350,174

Claims priority, application Great Britain April 24, 1952

12 Claims. (Cl. 290—4)

This invention relates to load-share responsive devices for paralleled systems of three-phase alternators.

When alternators are connected in parallel to a common utilisation network it is necessary to control the driving torque applied to each alternator to obtain a suitable distribution of the electrical load amongst the alternators.

An object of the present invention is to provide a simple and effective device which will respond to variations between the actual electrical load on a particular alternator of a parallel system of three-phase alternators and a desired share of the total electrical load on all the alternators.

Another object of the present invention is to provide an arrangement in which the device controls the driving torque applied directly or indirectly to the alternator to maintain the desired load-share on the alternator, although it is to be understood that the device may merely indicate the sense of the adjustment required to eliminate the departure from the desired load share if desired.

According to the present invention the load-share responsive device comprises a two-phase induction motor one stator phase of which is energised directly or indirectly by the line voltage between two phases of the paralleled system and the other is energised directly or indirectly by the difference between the voltage produced in the secondary winding of a transformer the primary winding of which is energised by the load current in the phase line of the particular alternator which is connected to the other phase of the system and the voltage produced in the secondary winding of a transformer, or system of transformers, the primary windings of which are energised by the total load current in the phase lines of all the paralleled alternators connected to said other phase line of the system, the transformation ratios of the opposed transformer systems being such that the power components of the voltages produced by them are equal when the load on the particular alternator corresponds to the desired share of the total load.

According to a feature of the invention the ratio of the transformation ratios of the opposed transformer systems is made adjustable. This is to allow for a change of conditions in the system as hereinafter made apparent. Load-share responsive devices as defined immediately above are suitable for use in combination with a power plant comprising a plurality of engine driven 3-phase alternators, and according to another feature of the present invention there may be provided in combination, a parallel system of 3-phase alternators comprising more than two alternators with, for each alternator, a load share responsive device, switchgear for connecting and disconnecting the alternator to and from the paralleled system, and means for simultaneously altering the ratio of the transformation ratios of the opposed transformer systems pertaining to the other alternator or alternators when the switchgear of the alternator is operated, so that the total load is redistributed among the other alternators in operation.

In the case where the parallel system comprises only two alternators, when one is switched out of course, the whole load is then taken by the remaining alternator.

Before alternators driven by separate engines can be paralleled it is necessary to obtain synchronism of the engine speeds to a high degree of accuracy, and for this purpose synchronising systems of known kind can be used. Once the alternators have been paralleled they will, within certain limits, maintain the engines in synchronism by variations in the electrical load distribution between them, the synchronising system then becoming inactive. It is clearly undesirable that loadings on individual alternators different from their appropriate shares of the total electrical load should be allowed to persist, and an application of the load-share responsive device of the present invention provides a solution of this problem.

According to yet another feature of the present invention therefore they may be provided in combination at least two engines each driving a three-phase alternator with means for synchronising the speeds of said engines, a utilisation network, switchgear for connecting each alternator in parallel with said network and also disconnecting it therefrom, and for each engine-alternator unit, a load share responsive device, said load-share responsive device being arranged to control the torque which said engine applies to the alternator of the unit to maintain an electrical load thereon corresponding to a desired share of the total load on all the alternators connected to the network.

The alternators may absorb part only of the power of said engines, the remaining power serving for example for the propulsion of an aircraft, ship or other vehicle. The synchronising means may synchronise the speed of the engines by governing their individual supplies of working medium, for example their fuel supply, or, in the case where only part of their power is used to drive the alternators their non-electrical loadings, in response to the difference between their speeds and a datum speed. Each load-share responsive device may also govern the torque applied to the alternator the load-share of which it controls by governing the supply of working medium to, or the non-electrical loading on the engine driving the alternator.

In a preferred combination as defined above the transformation ratios of the opposed transformer systems of each load-share responsive device are maintained in the ratio of the rating of the alternator the load share of which it controls, to the total rating of the alternators in operation, by switching alternatively in and out secondary winding turns simultaneously with the operation of said paralleling switchgear of the other alternators.

In the case where there are a number of alternator driving engines of equal power, the alternators will usually also be of equal rating, and the system may be arranged to divide the total electrical load equally between those alternators paralleled at any particular time.

Where a proportion of the power output of the alternator driving engines is used for propulsion it is undesirable to have substantial changes occurring in the propulsive power developed by any engine except under the operator's direct control.

According to another feature of the present invention therefore there may be provided means for limiting the range of torque control exercisable by each load-share responsive device to a small fraction of its possible control range, and warning means for indicating when each end of said limited control range is reached.

When the end of the automatic range is reached it is necessary for the operator to adjust the controls manually to bring conditions back within the scope of control by the automatic system. Runaway power changes as a result of a fault in the system are thus prevented.

In addition to obtaining close synchronism of the speeds of the driving engines, and therefore of the frequencies of alternators to be paralleled, it is also necessary that the voltages shall be substantially equal and in phase to an accuracy within which the system is self correcting. Voltage equality can be obtained by known voltage regulators acting on the excitation of the alternator, while phase-responsive means are also known which enable the paralleling switchgear to be operated while the phase of the incoming alternator is within the self correcting range. A known form of paralleling device for this purpose comprises a phase displacement meter and a system of time-delay and instantaneous relays which are energised when the phase displacement falls below a certain value. Paralleling is initiated if the instantaneous relay is still closed when the time delay relay closes after its delay interval, which imposes a minimum standard of synchronism dependent upon the delay time.

According to another feature of the present invention, the alternators may be provided with a single paralleling device of the character described in the previous paragraph, and with means for connecting it to the paralleling switchgear of any one of the alternators to operate the switch gear.

A preferred construction of paralleling device comprising a two-phase induction motor one stator phase of which is energised by a phase voltage of the network, the other stator phase of which is energised by a line voltage of an alternator to be paralleled with the network and the rotor of which is restrained by a control torque and by its inertia, with or without an escapement or equivalent control means, and is arranged to initiate paralleling of the alternator after moving through a predetermined range.

While as already stated it is preferred to use a single paralleling device and to provide means for switching it into circuit with any one of the alternators as required, the invention in its broader aspects is not limited to such an arrangement since a separate paralleling device could be provided for each alternator, though probably at the cost of some increase of weight.

If in an arrangement of the kind under consideration, a disturbance should occur sufficient to increase the torque transmission between an engine and its alternator beyond a certain value, which will commonly exceed its normal full load torque in the generating or motoring sense by a considerable amount, the alternator will pull out of step with the utilisation network and serious electrical disturbances will be caused. To avoid this difficulty, according to another feature of the invention, each alternator is coupled to its driving engine by a coupling device arranged to slip when the torque exceeds a predetermined proportion of the pull-out torque of the alternator.

An embodiment of the invention will now be described by way of example with reference to the accompanying drawings whereof:

Figure 1 is a circuit diagram of a load-share responsive device in accordance with the present invention, Figure 2 is a vector diagram related to Figure 1, Figure 3 is a circuit diagram of a power plant arrangement in accordance with the invention, Figure 4 is a portion of the circuit diagram of Figure 3 showing an alternative arrangement for synchronising the speeds of the engines, Figure 5 shows the arrangement of a paralleling device, Figures 6 and 7 are explanatory diagrams related to Figure 5, and Figure 8 is a front elevation of a coupling device.

Referring to Figures 1 and 2, $A_1$ and $A_2$ are two alternators connected in parallel to bus bars $a$, $b$ and $c$ while $L_1$ and $L_2$ are loads applied to the bus bars and S is a two-phase induction motor constituting a load-share indicator or corrector. One phase winding 10 of the motor S is energised by the line voltage $V_{bc}$, that is the voltage between the bus bars $b$ and $c$, while the other phase winding 11 of the motor S is in circuit with the secondary windings of current transformers $TA_1$, $TL_1$ and $TL_2$ the primary windings of which are respectively in the phase line $A_{1a}$ of the alternator $A_1$ and the phase lines $L_{1a}$ and $L_{2a}$ of the loads. The secondary winding $TA_1$ of the alternator transformer is arranged in opposition to the secondary windings $TL_1$ and $TL_2$ of the load transformers and the transformation ratio of $TA_1$ in relation to that of each of the transformers $TL_1$, $TL_2$ determines the load distribution at which there is no energisation of the motor winding 11 and no torque exerted upon its armature 12. By adjusting the transformation ratio of the alternator transformer $TA_1$, the datum of the system may be set for any desired share of the load to be carried by the alternator $A_1$. This is preferably done by varying the effective number of turns on the secondary winding of the transformer $TA_1$. For example, supposing in the particular two alternator installation so far described with reference to Figure 1, a system is required in which the alternator $A_1$ is to carry either one half or two thirds of the load on the bus bars $a$, $b$ and $c$. In this case, the secondary winding of the transformer $TA_1$ is divided into two parts one having three times as many turns as the other, the part having the lesser number turns being brought out to a pair of tappings, and a solenoid operated switch S being provided to connect these tappings together and short out this part of the winding when required.

The whole of the secondary winding of transformer $TA_1$ is designed so that the ratio of the transformation ratios of the transformer $TA_1$ and the transformers $TL_1$ and $TL_2$ together is 2:1, in which case the datum of the system is set for the alternator $A_1$ to take one half of the total load. If now it is required for some reason to make the alternator $A_1$ take two thirds of the load on the bus bars $a$, $b$ and $c$, the switch S is operated and this short circuits one quarter of the secondary winding of the transformer $TA_1$ so that the ratio of the transformation ratios of the opposed transformers becomes 3:2, and the datum of the system is adjusted so that instead of taking half of the load on the bus bars $a$, $b$ and $c$, the alternator $A_1$ takes two thirds of this load.

The operation of the load-share device may be understood from Figure 2, in which $E_a$, $E_b$ and $E_c$ denote the phase voltage vectors and $V_{ab}$, $V_{bc}$, $V_{ac}$ denote the line voltages between the lines $a$, $b$ and $c$. The motor winding 10 is energised by the line voltage $V_{bc}$, as may be seen from Figure 1. The current $I_a$ in the alternator feed line $A_{1a}$ will be displaced from the phase voltage $E_a$ by an angle $\phi$ according to the power factor of the system, and the same applies in the case of the load currents. The motor winding 11 is energised in opposite senses in proportion to the feed current and a predetermined share of the load currents as already explained, but only the components of the energisation currents which are in quadrature with the line voltage $V_{bc}$ produce torque in the motor S, and these, as may be seen from Figure 2, are in phase with the phase voltage $E_a$ and are therefore proportional to the power components in the supply and load lines. The torque acting on the armature 12 of the motor S is therefore proportional to the extent to which the actual load on the alternator $A_1$ differs from its predetermined share of the total load.

In the power plant shown in Figure 3 four alternators $A_1 \ldots A_4$ of equal rating are respectively driven by four engines $E_1 \ldots E_4$ through couplings $C_1 \ldots C_4$ designed to slip when a torque approaching the pull-out torque of the alternators is reached. Referring to Figure 8 the couplings $C_1 \ldots C_4$ each comprise a driving member 13 and a driven member 14 pressed together by a coiled spring 35, the compression in which is adjustable by a nut 19, the members 13, 14 having interengaging teeth 16 with sloping flanks. The compression and therefore the loading in the spring 35 is adjusted by the nut 19 so that the frictional resistance to slipping between the members 13 and 14 is only great enough to transmit a torque below a predetermined value less than the pull out torque of the alternator. If this value is exceeded the driving member 13 commences to slip relatively to the driven member 14, the inter-engaging teeth 16 riding over one another and the driven member being moved axially away from the driving member against the action of the spring 35. The system is therefore in some measure protected by couplings $C_1 \ldots C_4$ as later described. Each engine $E_1 \ldots E_4$ also drives a variable pitch propeller $P_1 \ldots P_4$ the pitches of which are controlled by variable datum governors $G_1 \ldots G_4$ of the constant speed type. The governors are controlled for synchronising purposes by synchronising corrector units of which to avoid complication of the diagram, only the one, $SYN_4$, pertaining to engine unit $E_4$ is shown. The synchronising system may be for example of the kind described in U. S. application Serial No. 213,710 filed March 3, 1951 by John Alfred Chilman, now Patent No. 2,696,269, granted December 7, 1954.

When a particular engine-alternator unit has been run up to synchronous speed and the alternator paralleled with the other alternators of the system its corrector unit $SYN_1 \ldots SYN_4$ becomes inactive since the alternators hold their driving engines in synchronism and accurate phase relation with one another. Such phase displacements as can occur without an alternator falling out of step affect the load distribution between the alternators but are insufficient to affect the synchronising systems. Each engine-alternator unit of the plant is accordingly provided with a load-share responsive device of the kind described with reference to Figure 1, only the device $S_4$ pertaining to the engine-alternator unit $E_4A_4$ being completely shown in Figure 3. Each of these devices acts in common with the corresponding synchronising corrector unit $SYN_1 \ldots SYN_4$ to control the datum of the corresponding governor $G_1 \ldots G_4$, the connection being on the differential principle and effected through a lever 15, which is actuated by links 36, 37, of which link 36 is actuated by a corrector unit SYN and link 37 is actuated by a lever arm 25 carried by the armature 12 of the motor S.

The alternators $A_1 \ldots A_4$ are connected by paralleling switches $PS_1 \ldots PS_4$ to a bus bar system B, only one phase of which is shown in full. Loads $L_1 \ldots L_4$ are supplied from the bus bars. Each paralleling switch PS is provided with an actuating coil $PS_1C \ldots PS_4C$ the excitation of which for paralleling is controlled by an automatic paralleler PAR, the latter being connectable at will to any of the coils $PS_1C \ldots PS_4C$ and to the corresponding alternator feed line by a coupled switch system generally indicated at 16. In the case of transient disturbances, whether on the electrical or mechanical load side of the system, the torque limiting couplings C will slip before the torque on the alternator affected rises, either in the generating or the motoring sense, to a value sufficient to pull the alternator out of step. To safeguard the system against more permanent faults of either kind a slow acting circuit breaker, for example of the thermally actuated type is included in each of the alternator feed lines as shown at $TCB_1 \ldots TCB_4$.

As in the arrangement shown in Figure 1, each load-share responsive device, of which only $S_4$ is shown in Figure 3, comprises a stator winding 10 which is energised by the voltage between two of the feed lines of its respective alternator. The other stator winding 11 is energised by an opposed transformer system comprising on the one hand current transformers $TL_1 \ldots TL_4$ in the load lines $L_1 \ldots L_4$ and common to all the load-share responsive devices and on the other hand a current transformer $TA_1 \ldots TA_4$ individual to the feed line and load-share responsive device of each alternator. The secondary winding of each transformer TA is divided into four equal parts and switches $SS_1 \ldots SS_4$ are provided whereby in each case three of these parts can be separately short-circuited. When any one alternator is supplying the whole load, the other three alternators being disconnected by their respective paralleling switches PS, three quarters of the secondary winding of the respective transformer TA is short circuited and the remaining quarter, which is in circuit with the load-share device S, produces a voltage which is exactly opposed by the voltage produced by the transformers $TL_1 \ldots TL_4$ working together. Suppose now that another alternator is run up to synchronism and paralleled by closing the appropriate switch PS, it is arranged that the closing of the switch releases one of the shorting switches SS pertaining to the alternator already paralleled so that half the secondary winding of its transformer TA is now in circuit, and the datum load share is reduced to one half. Similarly, one of the shorting switches SS pertaining to the incoming alternator is released in response to the closed state of the paralleling switch of the alternator already supplying the loads, so that the datum of the incoming alternator is also set for half the total load. By releasing further shorting switches SS as the third and fourth alternators are paralleled the datum load on each is set as one third and one fourth respectively. In Figure 3 the shorting switches SS have suffixes corresponding to the suffix of the paralleling switch PS with which each is associated in the manner just described.

The arrangement shown in the drawing and described above should be regarded as a diagrammatic simplification since it will be obvious that the secondary winding parts can be open-circuited instead of short-circuited or other means employed for control of the transformation ratio.

Each load-share responsive device S reacts through the corresponding governor G upon the pitch of the propeller so that by absorbing more or less power the balance transmitted to the alternator is varied to adjust the electrical loading upon it, the rate of response of the system being sufficiently slow not to interfere with the transient torque variations between the alternators and their engines which maintain the system in step.

Instead of the external load on the engines $E_1 \ldots E_4$ being controlled in this way, it is possible to control the power developed by the engine, by regulating the fuel supply to the engine, the external load either remaining constant or varying according to some other law, as for example in the case of jet propulsion engines.

Thus, referring to Figure 4, each governor $G_1 \ldots G_4$ may be arranged to adjust a throttle valve 17 thereby controlling the quantity of fuel going to the engine $E_1 \ldots E_4$ with which it is associated.

Since it is undesirable to have substantial changes in the power of the engines $E_1 \ldots E_4$ applied to drive the propellers $P_1 \ldots P_4$, except under the direct control of the pilot, the range of control exercisable by each load-share responsive device S is limited to a fraction of its possible range by restricting the movement of the lever-arm 25. Thus it is arranged that the arm 25 engages a stop 26 at each end of its control movement and thereby closes a pair of contacts 27 or 28 to energise a warning device 29 or 30 indicating to the pilot when the end of the control range of a device S has been reached and the sense of the engine adjustment required to bring the device S back into function.

Various known forms of paralleling device can be used in a power plant as shown in Figure 3, but the preferred paralleling device will now be described with reference to Figures 5 to 7.

In Figure 6, the left hand vector diagram shows the phase voltage vectors $E_a$, $E_b$ and $E_c$ and the corresponding line voltage vectors $V_{ab}$, $V_{bc}$ and $V_{ac}$ of the bus bar system while the right hand diagram shows the corresponding line voltage vectors $v_{ab}$, $v_{bc}$ and $v_{ac}$ of the incoming alternator. Assuming that equality of voltage and frequency have been obtained with sufficient accuracy, the incoming alternator must be paralleled when $V_{bc}$ and $v_{bc}$ are in phase with one another, that is, when $v_{bc}$ is in quadrature with $E_a$. If therefore, these two voltages or other equivalent pairs in quadrature, are applied to the two stator windings 41, 42 of a two-phase induction motor as shown in Figure 5, the motor will only deliver its maximum torque in one direction when $V_{bc}$ is exactly in phase with $v_{bc}$. The armature 20 of the motor is biassed by spring 21, the tension in which is adjustable, against a stop 22, and is arranged so that after a certain movement in the direction of the arrow 24 it closes a pair of contacts 23 which control the energisation of the paralleling switch $PS_1 \ldots PS_4$ of the incoming alternator. As the incoming alternator is running up to synchronous speed the armature 20 is subjected to a series of impulses in the direction of the arrow 24 centred about the instants of zero phase displacement of $V_{bc}$ and $v_{bc}$, the duration of successive impulses increasing as the difference of frequency decreases. In Figure 7 this is illustrated by the sharp peaked beat frequency curve 30 corresponding to a substantial difference of frequency, and the flat topped curve 31 corresponding to near equality of frequency. In this figure the ordinates represent torque which, as stated above, is a maximum at the in-phase instants $t_1$, $t_2$ etc. If the dotted line 32 represents the counter torque produced by the spring 21 holding the armature against the stop 22, the armature commences to move away from the stop at $t_3$ and ceases moving away at some instant $t_4$ when the torque and counter torque are equal, the slope of the connecting line 33 depending inter alia upon the rate of the spring 21. The distance moved will be a function of the area between the curve 30 and the line 33, and will increase as synchronism is approached.

The constants of the system are so selected that the movement is not sufficient to close the contacts 23 and initiate paralleling until the accuracy of synchronism and phase equalisation at the instant of paralleling will be within the self correcting range of the alternator, and any shock is moreover minimised by slipping of the torque limiting couplings C provided in the plant. In the right hand part of Figure 7 the time interval $t_5$–$t_6$ corresponds to the movement of the armature 20 up to the time of closing of the contacts 23 and the interval $t_6$–$t_7$ the delay occasioned by the actual operation of the paralleling switchgear. When the incoming alternator has been paralleled the torque on the armature 20 rises to and remains constant at its maximum value as shown at 34. The paralleler can now be disconnected with respect to the alternator just paralleled and used as and when required for paralleling other alternators of the plant.

In the paralleler here described some refinement of operation has been sacrificed relatively to certain known arrangements in the interest of simplicity and light weight, these considerations being of paramount importance in motive power plants, especially for aircraft.

We claim:

1. In a paralleled system of 3-phased alternators comprising at least two alternators a device responsive to variations between the actual electrical load on a particular alternator and a desired share of the total electrical load on all the alternators, said device comprising a 2-phase induction motor one stator phase of which is energised by the line voltage between two phases of the paralleled system, and the other stator phase of which is energised by the difference between the voltage produced in the secondary winding of a transformer the primary winding of which is energised by the load current in the phase line of the particular alternator which is connected to the other phase of the system, and the voltage produced in the secondary winding of an opposed system of transformers, the primary windings of which are energised by the total load current in the phase lines of all the paralleled alternators connected to said other phase of the system, the transformation ratios of the opposed transformer systems being such that the power components of the voltages produced by them are equal when the load on the particular alternator corresponds to the desired share of the total load and unequal when the load on the particular alternator differs from its desired share of the total load whereupon said induction motor commences to rotate.

2. A load-share responsive device as claimed in claim 1 wherein the ratio of the transformation ratios of the opposed transformer systems is adjustable.

3. The combination of a paralleled system of 3-phase alternators comprising more than two alternators with, for each alternator, a load share responsive device as claimed in claim 2, switchgear for connecting and disconnecting the alternator to and from the paralleled system, and means for simultaneously altering the ratio of the transformation ratios of the opposed transformer systems pertaining to the other alternator or alternators when the switchgear of the alternator is operated, so that the total load is redistributed among the other alternators in operation.

4. The combination of at least two engines each driving a 3-phase alternator with means for synchronising the speeds of said engines, a utilisation network, switchgear for connecting each alternator in parallel with said network and also disconnecting it therefrom, and, for each engine-alternator unit, a load share responsive device as claimed in claim 1, said load-share responsive device being arranged to control the torque which said engine applies to the alternator of the unit to maintain an electrical load thereon corresponding to a desired share of the total load on all the alternators connected to the network.

5. The combination as claimed in claim 4 wherein said alternators absorb part only of the power of said engines, said synchronising means synchronises the speed of said engines by governing the total power supplied by each engine in response to the difference between the speed of each engine and a datum speed, and each said load share responsive device governs said torque by governing the total power supplied by the engine driving the alternator the load-share of which it controls.

6. The combination as claimed in claim 3 wherein the transformation ratios of the opposed transformer systems of each load share responsive device are maintained in the ratio of the rating of the alternator the load share of which it controls, to the total rating of the alternators in operation, by switching alternatively in and out secondary winding turns simultaneously with the operation of said paralleling switch-gear of the other alternators.

7. The combination as claimed in claim 4 wherein there is provided means for limiting the range of torque control exercisable by each load-share responsive device to a small fraction of its possible control range, and warning means for indicating when each end of said limited control range is reached.

8. The combination as claimed in claim 4 wherein there is provided a single paralleling device and means for connecting said paralleling device to the paralleling switchgear of any one of the alternators to operate said switchgear.

9. The combination as claimed in claim 8 wherein the paralleling device comprises a 2-phase induction motor one stator phase of which is energised by a line voltage of the network, the other stator phase of which is energised by a line voltage of an alternator to be paralleled with the network, and the rotor of which is restrained by control means comprising means providing a control torque, and by its inertia, and wherein said rotor is arranged to initiate paralleling of the alternator after moving through a predetermined range.

10. The combination as claimed in claim 4 wherein each alternator is coupled to its driving engine by a coupling adapted to slip when the torque exceeds a predetermined portion of the pullout torque of the alternator.

11. In a paralleled system of 3-phase alternators comprising at least two alternators, a device responsive to variations between the actual electrical load on a particular alternator and a desired share of the total electrical load on all the alternators, said device comprising a 2-phase induction motor, means for energising one stator phase of said motor proportionately to the voltage between two phase lines of said particular alternator, means for energising the other stator phase of said motor proportionately to the current flowing in the third phase line of said particular alternator, and means for energising said other stator phase in opposition to the first said energisation proportionately by the total of the currents supplied by all the alternators to that line of the paralleled system to which said third phase line of said particular alternator is connected.

12. The combination as claimed in claim 4, wherein said alternators absorb part only of the power of said engines, said synchronising means synchronises the speed of said engines by governing the non-electrical loading of each engine in response to the difference between the speed of each engine and a datum speed, and each said load share responsive device governs said torque by governing the non-electrical loading on the engine driving the alternator the load-share of which it controls.

References Cited in the file of this patent

UNITED STATES PATENTS

| | | |
|---|---|---|
| Re. 20,548 | Doyle | Nov. 9, 1937 |
| 1,755,064 | Kennedy | Apr. 15, 1930 |
| 1,766,548 | Schnitzer | June 24, 1930 |
| 1,873,982 | Rusterholz | Aug. 30, 1932 |
| 1,984,940 | Plechl | Dec. 18, 1934 |
| 2,055,138 | Stivender | Sept. 22, 1936 |
| 2,103,818 | Kucera | Dec. 28, 1937 |
| 2,316,513 | Gay | Apr. 13, 1943 |
| 2,383,306 | Hanna et al. | Aug. 21, 1945 |
| 2,495,783 | Sorensen | Jan. 31, 1950 |
| 2,501,340 | Kresser | Mar. 21, 1950 |
| 2,590,265 | Miner, Jr. et al. | Mar. 25, 1952 |
| 2,636,132 | Stineman et al. | Apr. 21, 1953 |
| 2,696,269 | Chilman | Dec. 7, 1954 |